(12) United States Patent
Escobar Olmos et al.

(10) Patent No.: US 9,494,988 B2
(45) Date of Patent: Nov. 15, 2016

(54) REMOTELY AWAKENING AN ELECTRONIC DEVICE

(71) Applicant: INTERNATIONAL BUSINESS MACHINES CORPORATION, Armonk, NY (US)

(72) Inventors: Victor Rafael Escobar Olmos, Boeblingen (DE); Jakob C. Lang, Boeblingen (DE); Tomas Libal, Kralove (CZ); Angel Nunez Mencias, Boeblingen (DE); Fabian Romanowski, Karlsruhe (DE); Sven Sterbling, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 14/277,984

(22) Filed: May 15, 2014

(65) Prior Publication Data

US 2014/0344603 A1 Nov. 20, 2014

(30) Foreign Application Priority Data

May 16, 2013 (GB) .................................. 1308786.1

(51) Int. Cl.
*G06F 1/26* (2006.01)
*G06F 1/32* (2006.01)
(52) U.S. Cl.
CPC ............. *G06F 1/266* (2013.01); *G06F 1/3209* (2013.01)

(58) Field of Classification Search
CPC .................... G06F 1/266; G06F 1/3209; G06F 9/4401; G06F 9/4403; G06F 99/4418
See application file for complete search history.

(56) References Cited

U.S. PATENT DOCUMENTS

| 6,525,666 | B1 | 2/2003 | Shimoda |
| 2006/0012489 | A1 | 1/2006 | Yokota et al. |
| 2007/0268114 | A1* | 11/2007 | Enenkl .................. G06F 1/3203 340/10.1 |
| 2007/0279951 | A1 | 12/2007 | Wu |
| 2011/0140545 | A1 | 6/2011 | Eikum |

* cited by examiner

*Primary Examiner* — Dennis M Butler
(74) *Attorney, Agent, or Firm* — William A. Kinnaman, Esq.; Kevin P. Radigan, Esq.; Heslin Rothenberg Farley & Mesiti P.C.

(57) ABSTRACT

Remotely awakening an electronic device, in which an apparatus includes a power supply to supply external power; a receiver for an electromagnetic signal; a capacitor connected to the receiver; a switching circuit connected to the capacitor; a controller, being part of the electronic device, connected to receive power from the switching circuit and to provide a keep awake signal to the switching circuit. The switching circuit to connect the controller with the capacitor when the capacitor is loaded with a predefined amount of power via the receiver, and responsive to the keep awake signal to disconnect the controller from the capacitor and to connect the controller with the power supply afterwards. The controller performs an initialization phase in response to receiving power and enables the keep awake signal after completing the initialization phase.

20 Claims, 4 Drawing Sheets

REMOTELY AWAKENING AN ELECTRONIC DEVICE

PRIOR FOREIGN APPLICATION

This application claims priority from United Kingdom patent application number 1308786.1, filed May 16, 2013, which is hereby incorporated herein by reference in its entirety.

BACKGROUND

One or more aspects relate in general to electronic devices, and in particular, to remotely awakening an electronic device.

Electrically powered devices that respond to remote control transmitters generally consume standby power when the devices are off. Standby power is power consumed by an electrically powered device when the device is not in use but is still consuming power from a source of power. In operation, a remote control transmitter supplies a signal to an energized on-off circuit in these devices to cause them to switch from a standby mode to a normal operation mode. The device also draws power to enable the on-off circuit to act upon a remote signal to enable it to shift to a normal operation mode. This power consumption generally is between one and ten Watts per device. However, when the power consumption is aggregated among the many remotely controlled electrical devices in use in a region or country, the amount of power consumed becomes significant. Demands for power consumption are currently increasing; however, available natural power is decreasing. Therefore, there is a general trend to invent new technologies to save the power.

After each usage of such standby devices, users usually turn off the devices via remote controls. Being turned off by the remote controls, the electric devices enter their standby mode, which, in turn, allows the devices to continue consuming some electric power. This is due to the fact that the standby mode requires some electric power to run sensor circuits that continuously await instructions from the remote controllers to turn the devices back on.

Great efforts have been undertaken to reduce the standby power of electronic devices because in the course of global warming energy consumption of a country is a strategic subject. Yet the standby power consumption of remotely controlled devices has not been totally eliminated. Efforts to reduce this wasted power have not been completely successful. Some systems now consume less than a watt instead of several watts but still consume some power.

US 2011/0140545 A1, hereby incorporated by reference herein in its entirety, discloses a remote activation system for electrically powered devices that uses remotely transmitted electromagnetic radiation power to completely energize on-off circuitry in remotely activated devices with no standby power consumed to maintain remote activation capability. As a result, the electrically powered device is still readily activated by a remote means but does not consume any power to enable it to be remotely activated. The system comprises a remote electromagnetic radiation transmitter able to transmit radiation having sufficient power to enable the change in state of an electrical switch. The system also comprises an electrical activation element that is electrically attached to both the on-off circuit of an electrically powered device and a source of power to permit normal operation of the device. The activation element comprises a first electromagnetic radiation power converter able to convert electromagnetic radiation power into electrical power. It also comprises a first electrically operated normally non-conducting switch that is between a source of power for the device and its on-off circuit. The electrically powered device does not draw any power from any source to maintain its ability to be remotely turned on either to power the converter until it receives a remote transmission or to monitor the status of the converter. In addition, the switch has a non-conducting state when the electrically powered device is turned off.

BRIEF SUMMARY

One or more aspects relate to an apparatus, method, system and computer program product for efficiently awakening non wired electronic devices by weak electromagnetic signals without using standby power.

According to a first aspect, an apparatus for remotely awakening an electronic device is provided. The apparatus includes, for instance, a power supply to supply external power; a receiver to receive an electromagnetic signal; a capacitor connected to said receiver; a switching circuit connected to said capacitor; a controller, being part of said electronic device, connected to receive power from the switching circuit and to provide a keep awake signal to the switching circuit, wherein the switching circuit is to connect the controller with the capacitor when the capacitor is loaded with a predefined amount of power via the receiver, and responsive to the keep awake signal to disconnect the controller from the capacitor and to connect the controller with the power supply afterwards, and wherein the controller is to perform an initialization phase in response to receiving power and enables the keep awake signal after completing the initialization phase.

According to a further aspect, a method for remotely awakening an electronic device is provided. The method includes, for instance, tuning a receiver to an electromagnetic signal with a predefined frequency; amplifying the electromagnetic signal in the receiver connected to a capacitor; loading the capacitor connected to the receiver with a predefined amount of power; powering up a controller, being part of the electronic device, connected to receive power from the capacitor via a switching circuit; performing an initialization phase in the controller in response to receiving power; providing a keep awake signal by the controller to the switching circuit after completing the initialization phase; connecting the controller with a power supply; and disconnecting the controller from the capacitor by the switching circuit being responsive to the keep awake signal.

Further a computer program product including a computer usable medium including a computer readable program, wherein the computer readable program when executed on a computer causes the computer to perform a method for remotely awakening an electronic device is provided. The method includes, for instance, tuning a receiver to an electromagnetic signal with a predefined frequency; amplifying the electromagnetic signal in the receiver connected to a capacitor; loading the capacitor connected to the receiver with a predefined amount of power; powering up a controller, being part of the electronic device, connected to receive power from the capacitor via a switching circuit; performing an initialization phase in the controller in response to receiving power; providing a keep awake signal by the controller to the switching circuit after completing the initialization phase; connecting the controller with a power supply; disconnecting the controller from the capacitor by the switching circuits being responsive to the keep awake signal.

BRIEF DESCRIPTION OF THE SEVERAL VIEWS OF THE DRAWINGS

One or more aspects together with the above-mentioned and objects and advantages may best be understood from the following detailed description of the embodiments, but not restricted to the embodiments, wherein is shown in.

DETAILED DESCRIPTION

Figure 1:
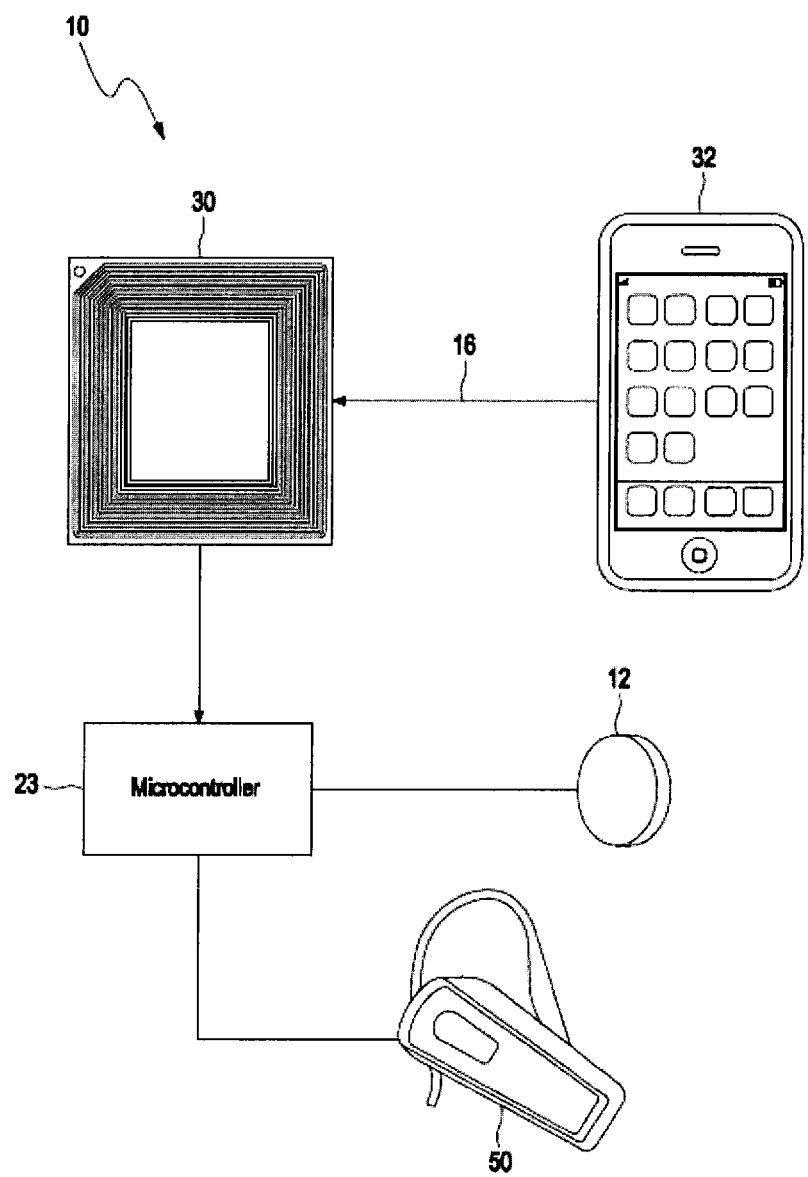
FIG. 1 a basic diagram of a system for remotely awakening an electronic device using an apparatus as described according to an embodiment of the invention.

In the drawings, like elements are referred to with equal reference numerals. The drawings are merely schematic representations, not intended to portray specific parameters of one or more aspects of the invention. Moreover, the drawings are intended to depict only typical embodiments of one or more aspects, and therefore, should not be considered as limiting the scope of the invention.

FIG. 1 exhibits a basic diagram of a system for remotely awakening an electronic device 50 using an apparatus 10 as described according to an embodiment. In the example shown an electromagnetic signal 16, e.g. in the form of a high frequency electromagnetic field, is sent from a mobile transmitter 32, like a mobile phone, and subsequently received by an antenna, e.g. an RFID-antenna 30. The electromagnetic signal 16 may be sent on a special frequency, in particular a resonance frequency of the antenna 30. Then the electromagnetic signal 16 is fed to a box, named microcontroller, 23 which reacts on an interrupt initiated by the electromagnetic signal 16 and serves for triggering a wakeup sequence of an electronic device 50, like a headset, e.g., working as a Bluetooth device for a mobile phone. The microcontroller 23 is connected to an internal battery serving as a power supply means 12 for the microcontroller 23, but not in use during a standby phase, connected only when activated by a trigger signal in the microcontroller 23 initiated from the electromagnetic signal 16 from the mobile phone 32.

In the diagrams shown (FIGS. 1 and 2), the microcontroller 23 is including a receiver 14 for an electromagnetic signal 16; a capacitor 18 connected to the receiver 14; a switching circuit 20 connected to the capacitor 18; a controller 22, being part of the electronic device 50, connected to receive power from the switching circuit 20 and to provide a keep awake signal 24 to the switching circuit 20; wherein the switching circuit 20 includes connection means to connect the controller 22 with the capacitor 18 when the capacitor 18 is loaded with a predefined amount of power via the receiver 14; switching means responsive to the keep awake signal 24 to disconnect the controller 22 from the capacitor 18 and to connect the controller 22 with the power supply means 12 afterwards; and wherein the controller 22 performs an initialization phase in response to receiving power and enables the keep awake signal 24 after completing the initialization phase. The numerals are referring to elements shown in FIG. 2.

Figure 2:
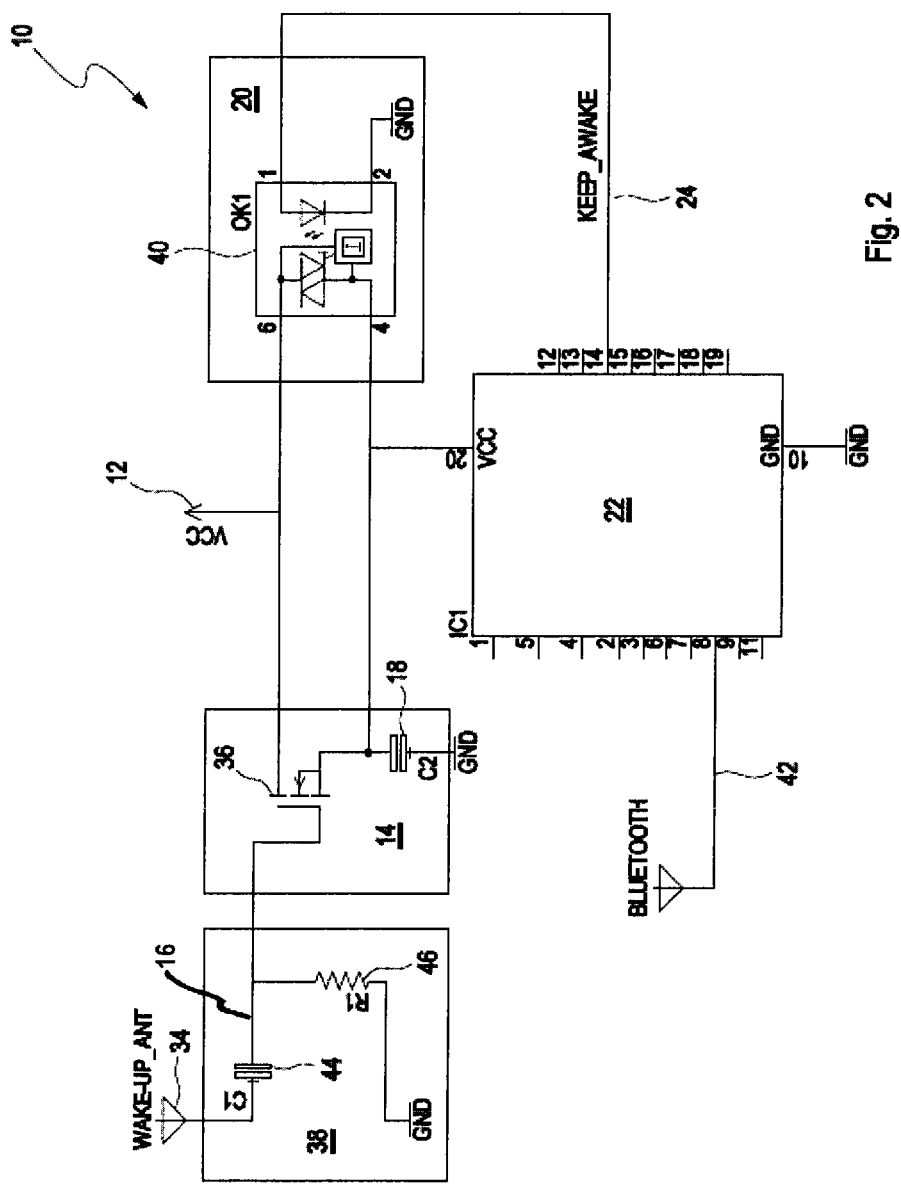
FIG. 2 an apparatus for remotely awakening an electronic device according to an embodiment of the invention.

FIG. 2 shows an apparatus 10 for remotely awakening an electronic device 50 according to an embodiment. An electromagnetic signal 16 is received by an antenna 34 which is connected to a high-pass filter circuit 38 serving for eliminating white noise in the electromagnetic signal 16 and including a capacitor 44 and a resistor 46. The antenna 34 may be a directional antenna for gaining additional gain and being selectable to different transmitters. Next the filtered electromagnetic signal 16 is fed to a receiver 14, amplifying the signal by a MOSFET transistor 36 which exhibits extremely low power leakage as, e.g., 3.5 pW. Due to the high impedance of the MOSFET transistor 36, very low power of the received electromagnetic signal 16 is needed to reach the passive antenna 34. The electromagnetic signal 16, in one embodiment, may be corresponding to a resonance frequency of the receiver 14 and/or an antenna 34 of the receiver 14. The receiver 14 comprises a capacitor 18 which is loaded by the amplified signal 16, where the capacity of the capacitor 18 may be determined according to the time needed to power the controller 22 until the controller 22 is connected to the power supply means 12.

Receiver 14 and switching circuit 20 are connected to a power supply means 12. Then the amplified signal 16 is fed to a switching circuit 20 connected to the capacitor 18 and comprising connection means to connect a controller 22 with the capacitor 18 when the capacitor 18 is loaded with a predefined amount of power via the receiver 14, as well as switching means responsive to a keep awake signal 24 to disconnect the controller 22 from the capacitor 18 and to connect the controller 22 with the power supply means 12 afterwards. The switching circuit 20 is connected to the controller 22, connected to receive power from the switching circuit 20 and to provide the keep awake signal 24 to the switching circuit 20. The controller 22 performs an initialization phase in response to receiving power and enables the keep awake signal 24 after completing the initialization phase. The controller 22 is also connected to the power supply means 12 and serves in the embodiment shown as a Bluetooth device, as shown by a Bluetooth antenna 42. In the switching circuit 20 the keep awake loop is based on a triac 40. The switching circuit 20 is keeping power after the end of the wake up signal.

Figure 3:
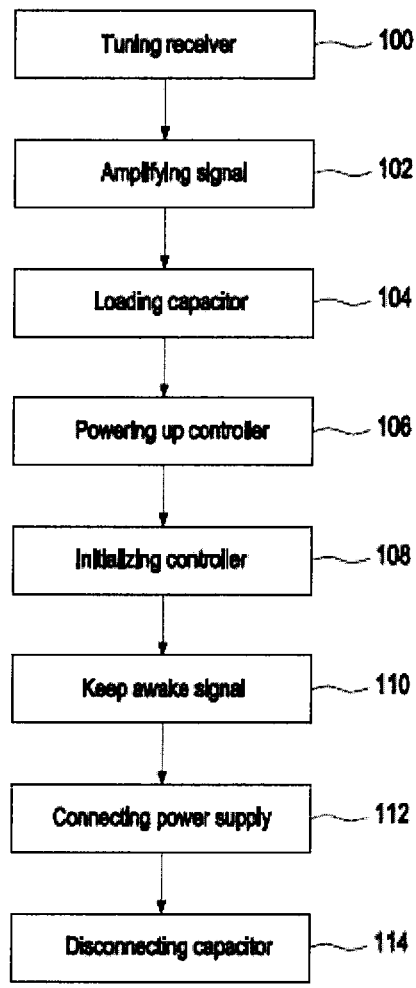
FIG. 3 a basic flow diagram of a method for remotely awakening an electronic device according to an embodiment of the invention.

In FIG. 3 a basic flow diagram of a method for remotely awakening an electronic device 50 according to an embodiment is shown. The diagram serves for explaining the flow as well as the different steps of the method where the method comprises tuning a receiver 14 to an electromagnetic signal 16 with a predefined frequency, step 100; amplifying the electromagnetic signal 16 in the receiver 14 connected to a capacitor 18, step 102; loading the capacitor 18 connected to the receiver 14 with a predefined amount of power, step 104; powering up a controller 22, being part of the electronic device 50, connected to receive power from the capacitor 18 via the switching circuit 20, step 106; performing an initialization phase in the controller 22 in response to receiving power, step 108; providing a keep awake signal 24 by the controller 22 to the switching circuit 20 after completing the initialization phase, step 110; connecting the controller 22 with a power supply means 12, step 112; disconnecting the controller 22 from the capacitor 18 by the switching means being responsive to the keep awake signal 24, step 114. The numerals are referring to elements shown in FIG. 2.

Additionally the controller 22 may be disconnected from the power supply means 12 after the awakening process is completed. Further the controller 22 may be in an active loop until the power supply means 12 is disconnected.

Figure 4:
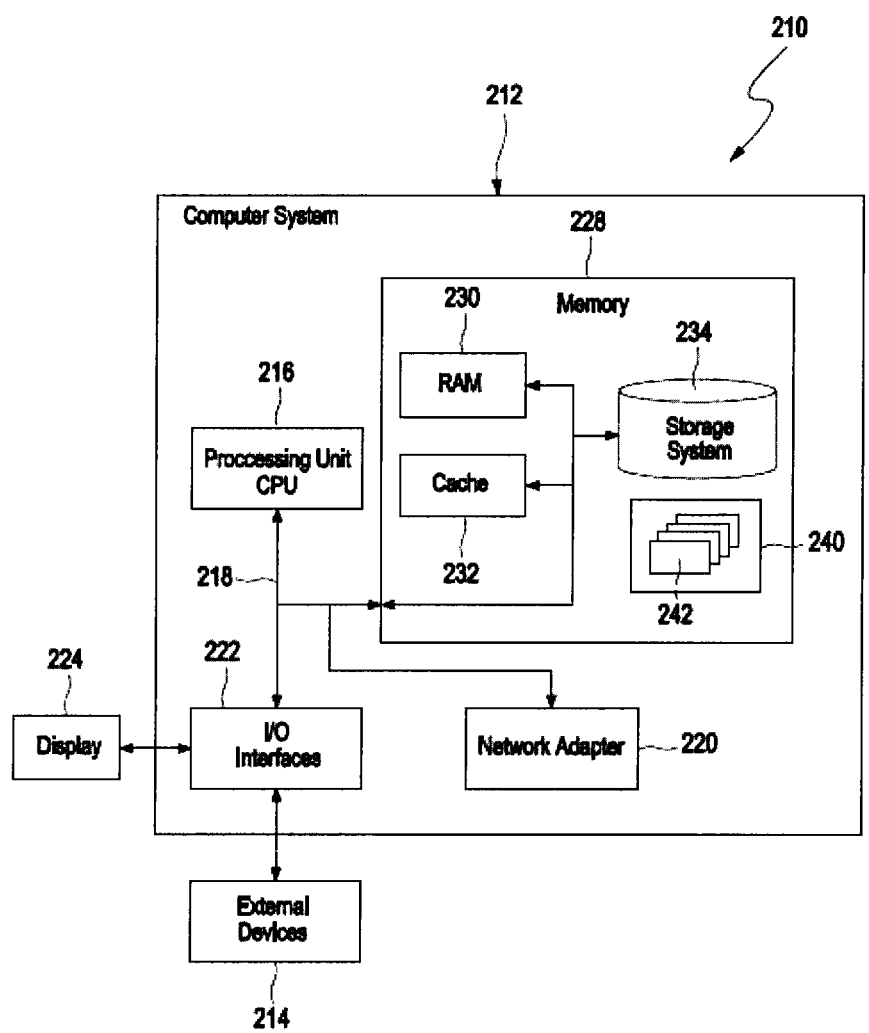
FIG. 4 an example embodiment of a data processing system for carrying out a method according to one or more aspects.

Referring now to FIG. 4, a schematic of an example of a data processing system 210 is shown. Data processing system 210 is only one example of a suitable data processing system and is not intended to suggest any limitation as to the scope of use or functionality of embodiments described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media comprising memory storage devices.

As shown in FIG. 4, computer system/server 212 in data processing system 210 is shown in the form of a general-purpose computing device. The components of computer system/server 212 may include, but are not limited to, one or more processors or processing units 216, a system memory 228, and a bus 218 that couples various system components comprising system memory 228 to processor 216.

Bus 218 represents one or more of any of several types of bus structures, comprising a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically comprises a variety of computer system readable media. Such media may be any available media that is accessible by computer system/server 212, and it comprises both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of one or more embodiments.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices.

An external device 214 may also be an apparatus 10 as described by the invention for remotely awakening the computer system 210.

Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

According to a first aspect, an apparatus for remotely awakening an electronic device comprises power supply means to supply external power; a receiver for an electromagnetic signal; a capacitor connected to the receiver; a switching circuit connected to the capacitor; a controller, being part of the electronic device, connected to receive power from the switching circuit and to provide a keep awake signal to the switching circuit; wherein the switching circuit comprises connection means to connect the controller with the capacitor when the capacitor is loaded with a predefined amount of power via the receiver; switching means responsive to the keep awake signal to disconnect the controller from the capacitor and to connect the controller with the power supply means afterwards; and wherein the controller performs an initialization phase in response to receiving power and enables the keep awake signal after completing the initialization phase.

In one aspect, a non-wired or remote device is to wake up without using an energy source on the awakening apparatus, where the awakening apparatus is in deep sleep mode until a powerful enough signal triggers an interrupt that wakes up the apparatus. This may be performed via induction over an induction antenna. The stand-by status works without any energy to be spent in the slave device, which means the one which is sleeping "waiting" for the signal.

The controller for awakening the electronic device does not, in one embodiment, need any power during the standby phase, because not only the clock is disabled but also the memory is not powered in this phase. Thus, one or more aspects are well suited for applications where power consumption is critical and where most of the time the application is idle.

A switching circuit is provided, in one aspect, to switch the power source for a circuitry, from a temporary power source, as a capacitor, storing energy from an electromagnetic wake up signal, to an internal power source, subsequent to the circuitry reaching an operational state.

In one embodiment, simpler discrete components compared to the state of the art are used, allowing the reception of weaker signals, thus extending the range of the device for a transmitter of the same power, and avoiding unrelated wake-ups due to environmental electromagnetic noise.

Examples for using the apparatus described herein for remotely awakening an electronic device may be a headset which has no power-on button, which just uses energy when an MP3 player sends a signal to start or a TV which doesn't require anymore the stand-by LED, because the remote control sends the very first power-on signal, or general devices which start to work when a smartphone is sending a signal. Other examples may be smart cable socket distributors which are only active when a signal by a personal RFID or a smartphone is arriving or smart automated houses where only electrical devices which the owner wishes to be active are operating. Thus the energy consumption in many houses during the night or during working hours could be greatly reduced. Also long term disconnected devices, as e.g. on spaceships or satellites, which have been in deep sleep for a long time may be activated by the apparatus on a remote way.

The receiver may be, in one embodiment, connected to an RFID-antenna for receiving the electromagnetic signal. These RFID-antennas are widely used antennas being relatively cheap and also do not consume much space as they are normally used, e.g., in packing equipment or clothes.

In one aspect, the electromagnetic signal for remotely awakening an electronic device may be sent by a mobile transmitter. This mobile transmitter can be a transmitter as used e.g. for opening a garage or even a remote car key, but particularly a mobile phone which has more power to cover long distances. Thus even much greater distances may be spanned for remotely awakening an electronic device.

The electromagnetic signal may be, in one or more aspects, corresponding to a resonance frequency of the receiver and/or an antenna of the receiver. This may use reduced electromagnetic power for activating the apparatus, because the resonance effect is gaining energy due to enhancement of the signal in the resonance region by many orders of magnitude. Further, if the antenna is adjusted to resonate to a particular frequency, different devices may be in different frequencies.

The receiver may be connected to a directional antenna for receiving the electromagnetic signal. A similar effect as using a resonance frequency of the antenna or receiver is using a directional antenna exhibiting a significant gain compared to a normal non-directional antenna. Thus no omnidirectional signal for the discovery by the receiver via the antenna is used but a strongly focused signal. Besides directional antennas have the advantage of only waking up the intended device. The position of the target device can be determined detecting the interference created by the receiving antenna in the magnetic field created by the emitter.

In one embodiment, the switching circuit may use a triac for switching to the power supply means. Triacs once triggered, continues to conduct until the current drops below a certain threshold, called the holding current. Besides they are able to control very large power flows with mA-scale gate currents.

Also, the receiver may use a MOSFET transistor for amplifying the electromagnetic signal. A MOSFET transistor exhibits extremely low power leakage as, e.g., 3.5 pW. Due to the high impedance of the MOSFET transistor, very low power of the received electromagnetic signal is needed to reach the stimulus threshold of the passive antenna.

The switching circuit may be keeping power after the keep awake signal is disabled. Thus the keep awake signal can be maintained in an efficient way in order to ensure the controller to complete the booting-up sequence.

In one embodiment, a high-pass filter may be used by the receiver to eliminate white noise when receiving the electromagnetic signal. This serves for getting additional gain on the electromagnetic signal for awakening the electronic device.

Further, the electromagnetic signal may favorably be sent by a transmitter until the capacitor is loaded. By this way it can be ensured that the capacitor is accumulating enough energy to activate the following stages as switching circuit and controller.

The capacity of the capacitor may be determined according to the time needed to power the controller until the controller is connected to the power supply means. In a similar aspect the purpose is also to ensure that the capacitor is accumulating enough energy to activate the following stages as switching circuit and controller.

In one embodiment, the electronic device may be a Bluetooth device. Bluetooth headsets are widely used electronic devices for mobile communication and entertainment. So using an aspect of the apparatus described herein, they need not exhibit any power-on button because they can be activated by simply sending an electromagnetic signal without wasting additional standby power.

According to a further aspect, a method for remotely awakening an electronic device comprises tuning a receiver to an electromagnetic signal with a predefined frequency; amplifying the electromagnetic signal in the receiver connected to a capacitor; loading the capacitor connected to the receiver with a predefined amount of power; powering up a controller, being part of the electronic device, connected to receive power from the capacitor via a switching circuit; performing an initialization phase in the controller in response to receiving power; providing a keep awake signal by the controller to the switching circuit after completing the initialization phase; connecting the controller with a power supply means; disconnecting the controller from the capacitor by the switching means being responsive to the keep awake signal. In one embodiment, steps are described for activating an apparatus for remotely awakening an electronic device.

In one embodiment, the controller may be disconnected from the power supply means after the awakening process is completed. Thus, an additional power-saving step may be implemented.

The controller may be arranged, for instance, in an active loop until the power supply means is disconnected. In one example, there is a wait until the power drops because there is time needed to discharge the capacitor charged before.

According to a further aspect, a data processing program for execution in a data processing system comprises an implementation of an instruction set for performing a method as described above when the data processing program is run on a computer.

Further, a computer program product comprises a computer usable medium comprising a computer readable program, wherein the computer readable program when executed on a computer causes the computer to perform a method for remotely awakening an electronic device comprising tuning a receiver to an electromagnetic signal with a predefined frequency; amplifying the electromagnetic signal in the receiver connected to a capacitor; loading the capacitor connected to the receiver with a predefined amount of power; powering up a controller, being part of the electronic device, connected to receive power from the capacitor via a switching circuit; performing an initialization phase in the controller in response to receiving power; providing a keep awake signal by the controller to the switching circuit after completing the initialization phase; connecting the controller with a power supply means; disconnecting the controller from the capacitor by the switching means being responsive to the keep awake signal.

As will be appreciated by one skilled in the art, aspects of the present invention may be embodied as a system, method or computer program product. Accordingly, aspects of the present invention may take the form of an entirely hardware embodiment, an entirely software embodiment (comprising firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, comprising, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, comprising but not limited to wireless, wireline, optical fiber cable, RF, etc., or any suitable combination of the foregoing.

Computer program code for carrying out operations for aspects of the present invention may be written in any combination of one or more programming languages, comprising an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, comprising a local area network (LAN) or a wide area network (WAN), or the connection may be made to an external computer (for example, through the Internet using an Internet Service Provider).

Aspects of the present invention are described with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture comprising instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect, a data processing system for execution of a data processing program, comprises software code portions for performing a method described above.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. An apparatus for remotely awakening an electronic device, said apparatus comprising:
   a power supply to supply external power;
   a receiver to receive an electromagnetic signal;
   a capacitor connected to said receiver;
   a switching circuit connected to said capacitor;
   a controller, being part of said electronic device, connected to receive power from said switching circuit and to provide a keep awake signal to said switching circuit, wherein said switching circuit is to connect said controller with said capacitor when said capacitor is loaded with a predefined amount of power via said receiver, and responsive to said keep awake signal to disconnect said controller from said capacitor and to connect said controller with said power supply afterwards, and wherein said controller is to perform an initialization phase in response to receiving power and enables said keep awake signal after completing said initialization phase.

2. The apparatus of claim 1, wherein the receiver is connected to an RFID-antenna for receiving the electromagnetic signal.

3. The apparatus of claim 1, wherein the electromagnetic signal for remotely awakening an electronic device is sent by a mobile transmitter.

4. The apparatus of claim 1, wherein the electromagnetic signal is corresponding to at least one of a resonance frequency of the receiver or an antenna of the receiver.

5. The apparatus of claim 1, wherein the receiver is connected to a directional antenna to receive the electromagnetic signal.

6. The apparatus of claim 1, wherein the switching circuit uses a triac for switching to the power supply.

7. The apparatus of claim 1, wherein the receiver uses a MOSFET transistor to amplify the electromagnetic signal.

8. The apparatus of claim 1, wherein the switching circuit is keeping power after the keep awake signal is disabled.

9. The apparatus of claim 1, wherein a high-pass filter is used by the receiver to eliminate white noise when receiving the electromagnetic signal.

10. The apparatus of claim 1, wherein the electromagnetic signal is sent by a transmitter until the capacitor is loaded.

11. The apparatus of claim 1, wherein the capacity of the capacitor is determined according to the time needed to power the controller until the controller is connected to the power supply.

12. The apparatus of claim 1, wherein the electronic device is a Bluetooth device.

13. A method for remotely awakening an electronic device, said method comprising:
   tuning a receiver to an electromagnetic signal with a predefined frequency;
   amplifying the electromagnetic signal in the receiver connected to a capacitor;
   loading said capacitor connected to said receiver with a predefined amount of power;
   powering up a controller, being part of said electronic device, connected to receive power from the capacitor via a switching circuit;
   performing an initialization phase in said controller in response to receiving power;
   providing a keep awake signal by the controller to said switching circuit after completing said initialization phase;
   connecting said controller with a power supply; and
   disconnecting the controller from said capacitor by said switching circuit being responsive to said keep awake signal.

14. The method of claim 13, wherein the controller is disconnected from said power supply after the awakening process is completed.

15. The method of claim 13, wherein the controller is in an active loop until the power supply is disconnected.

16. A computer program product comprising a non-transitory computer readable medium including a computer readable program, wherein the computer readable program when executed on a computer causes the computer to perform a method for remotely awakening an electronic device, said method comprising:
   performing an initialization phase in a controller in response to the controller receiving power from a capacitor, the capacitor being charged via an electromagnetic signal received at the electronic device, and the capacitor and the controller being part of the electronic device;
   providing a keep awake signal by the controller to a switching circuit of the electronic device after the controller completes the initialization phase of an awakening process of the electronic device, wherein:
   the keep awake signal connects the controller with a power supply via the switching circuit to power the controller; and
   the keep awake signal removes the controller from being powered by the capacitor via the switching circuit being responsive to the keep awake signal.

17. The computer program product of claim 16, wherein the switching circuit is keeping power after the keep awake signal is disabled.

18. The computer program product of claim 16, wherein the capacity of the capacitor is determined according to the time needed to power the controller until the controller is connected to the power supply.

19. The computer program product of claim 16, wherein the controller is disconnected from said power supply after the awakening process is completed.

20. The computer program product of claim 16, wherein the controller is in an active loop until the power supply is disconnected.

* * * * *